June 14, 1927.
A. P. TREADWELL ET AL
1,632,636
CHECK VALVE
Filed Feb. 25, 1926
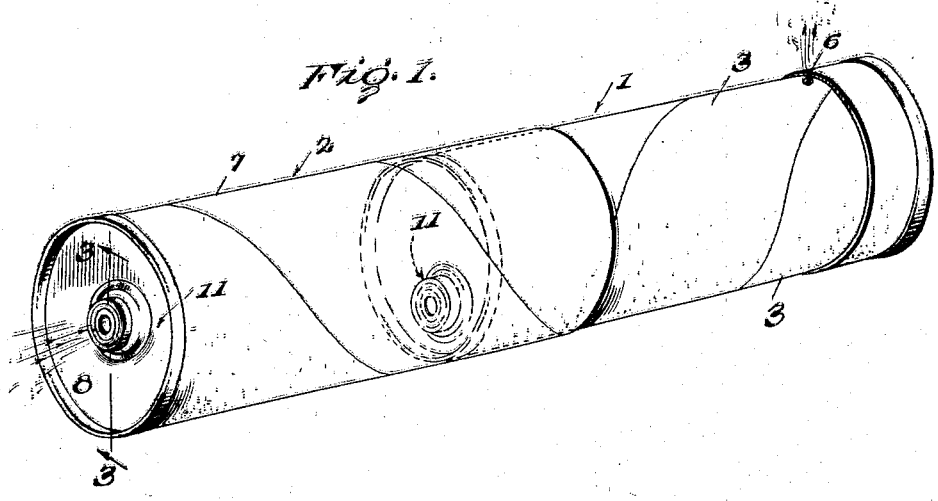
Fig. 1.
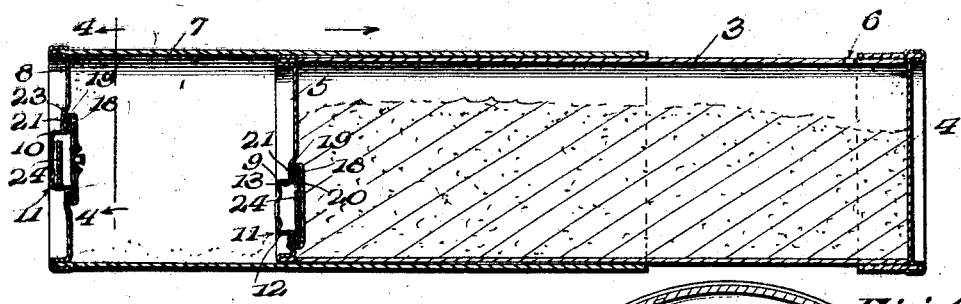
Fig. 2.
Fig. 3. Fig. 5. Fig. 4.
WITNESSES
W. A. Williams
Inventors
Josiah Flournoy
Albert P. Treadwell
BY
ATTORNEYS Patented June 14, 1927.

1,632,636

UNITED STATES PATENT OFFICE.

ALBERT P. TREADWELL AND JOSIAH FLOURNOY, OF COLUMBUS, GEORGIA.

CHECK VALVE.

Application filed February 25, 1926. Serial No. 90,594.

Our invention relates to improvements in check valves, and it consists in the combinations, constructions and arrangements herein described and claimed.

An object of the invention is the provision of a check valve which is adapted to prevent flow of pressure fluid therethrough in one direction and to permit a limited volume of pressure fluid to pass therethrough in the opposite direction.

A further object of the invention is the provision of a check valve which comprises parts adapted to be assembled and connected with the edge portion of an opening in a supporting plate in a single operation.

A still further object of the invention is the provision of a check valve construction which includes a supporting plate having an opening and a check valve having a housing extending through the opening, the housing and the supporting plate having interlocking means for firmly securing the housing to the supporting plate and at the same time preventing disassembly of the parts of the check valve.

Other objects and advantages of the invention will be apparent from the following description, considered in conjunction with the accompanying drawings, in which Figure 1 is a perspective view of an insecticide container and distributer, the members of which constitute a pumping device and are equipped with identical check valve constructions embodying the invention, Figure 2 is a longitudinal vertical section through the insecticide container and distributer and through the check valve constructions thereof, Figure 3 is a relatively enlarged fragmentary section substantially along the line 3—3 of Figure 1, Figure 4 is a fragmentary vertical section substantially along the line 4—4 of Figure 2, Figure 5 is a perspective group view of two cooperating elements of a check valve embodying the invention.

A check valve embodying the invention is particularly well adapted for use in association with the head of a member of a pumping device, such as is used in a combined insecticide container and distributer of the type illustrated in Figures 1 and 2 and of the type which is disclosed in Letters Patent of the United States #1,540,198, granted to Albert P. Treadwell June 2nd, 1925.

The insecticide container and distributer exhibited in Figures 1 and 2 includes a pumping device which comprises two telescopic sections generally indicated at 1 and 2, respectively. The section 1 comprises a tubular body 3 which is closed at its forward end by a head 4 and at its rearward end by a plate 5 and which constitutes a container for an insecticide. The body 3 of the section 1 is provided with a discharge opening 6 of relatively slight area adjacent to its forward end.

The section 2 comprises a tubular body 7 which fits closely and slidably on the body 3 of the section 1 and is closed at its rearward end by a plate 8. The sections 1 and 2 form a pumping device and the plates 5 and 8 are formed with openings 9 and 10 respectively therein, each of which has an inwardly opening check valve generally designated 11 associated therewith.

The check valve 11 has a casing comprising a tubular body 12 which fits snugly in and extends through the associated opening 9 or 10. The casing body 12 has an integral head 13 at its outer end which is formed with a convexo-concave central portion 14 surrounded by an inwardly bent annular corrugation 15. The central portion 14 of the head 13 has a central inlet opening 16 formed therein.

The casing body 12 is formed with an outwardly extending flange 13 at its inner or forward end. The casing of the check valve also includes a head 18 which is joined integrally at its edge to an annular attaching member 19. The annular attaching member 19 is adapted to extend across the edge of the flange 17 so that a stop disk 20 which fits within the annular member 19 will have the marginal edge portion thereof clamped against the flange 17 by the corresponding portion of the head 18. The portion of each of the plates 5 and 8 which surround the openings 9 or 10 in the plates is offset rearwardly as indicated at 21 and then is turned forwardly and outwardly, thus producing an outwardly extending flange 22 which is located within a tapering portion 23 of the plate 5 or 8, an annular groove or seat thus being produced between the flange 22 and the portion 21 of the plate 5 or 8.

In assembling the check valve, the casing body 12 is pressed into the opening 9 or 10 from the front after a relatively thin disk valve 24 has been placed in the casing body 12 and after the annular attaching portion 19 of the head 18 has been forced onto the flange 17 to position to clamp the marginal edge portion of the disk 20 against the flange 17. The operation of forcing the casing body 12 into the opening 9 or 10 from the front will result in the edge portion 25 of the annular attaching member 19 being bent inwardly to place in the annular seat between the flange 22 and the portion 21 of the associated plate 5 or 8 and the check valve housing thus will be attached firmly to the associated plate and at the same time the stop disk 20 will be firmly clamped against the flange 17 and the disk valve 24 will be housed within the valve casing.

The head 18 has a forwardly turned convexo-concave central portion 26 in which a plurality of centrally convergent radial slits 27 have been formed, thus defining an outlet orifice or port for the valve casing. The stop disk 20 is formed with a plurality of apertures 28 which are arranged in a circle in the disk 20 concentric with the disk 20. A circle tangent to the inner edges of the apertures 28 is of slightly greater diameter than a circle which is tangent to the outer edges or ends of the slits 27 in the central portion 26 of the casing head 18. Also, it is to be noted at this point that the disk valve 24 is polygonal in cross sectional configuration and that the cross sectional area of the disk 24 is slightly less than the area of a circle which is tangent to the outer edges of the openings 28 in the stop disk 20. The cross sectional area of the disk valve 24 is slightly less than that of the space within the casing body 12 so that the disk valve 24 may move rather freely flatwise or axially in the casing body 12 and is prevented from tilting or turning on an edge thereof to horizontal position within the casing body 12 by reason of the fact that the diameter of the disk valve 24 is considerably greater than the distance between the heads of the valve casing. Also, it is to be noted that the cross sectional area of the disk 24 is considerably greater than that of the space within the valve casing that is encircled by the corrugation 15 and the corrugation 15 therefore forms a seat against which the disk 24 will contact flatwise when the disk 24 is at the rearward end of the valve casing.

The disk valve 24 is imperforate and light in weight, preferably being a disk which is made of light gauge cardboard or like material.

It also will be understood that in actual practice the check valves 11 probably will be secured in place in the openings 9 and 10 of the plates 5 and 8 before such plates are secured in place on the bodies 3 and 7 of the members of the pumping device with which insecticides are used.

From the foregoing description of the various parts of the device, the operation thereof may be readily understood. Air or other fluid which enters the valve casing through the inlet port 16 will force the disk valve 24 against the stop plate 20. A limited volume of the pressure fluid then is permitted to pass about the edge of the disk valve 24 through the openings 28 of the stop disk 20 and thence out of the valve casing through the slits 27 of the outlet port of the valve casing, the pressure fluid which passes from the valve casing being directed therefrom at relatively high velocity in the form of narrow streams. Until the disk valve 24 moves against the seat 15, a limited volume of air or other fluid may be drawn into the space within the valve casing through the slits 27 and portions of the openings 28 of the stop disk 20 but the contact of the disk valve 24 against the seat 15 will prevent such fluid from passing from the valve casing through the port 16. Also, it will be observed that the slits 27 are relatively narrow and moreover the unobstructed portions of the openings 28 in the stop disk 20 are of slight area so that but very little, if any, powder from the container member 1 will be drawn into the space within the check valve casing of the plate 5 when the member 2 is pulled rearwardly of the body of the member 1 of the combined insecticide container and distributer shown in Figures 1 and 2 and the suction on the disk valve 24 will hold that disk valve against the seat 15 so that no powder is permitted to pass from the check valve that is associated with the plate 5 into the space between the plates 5 and 8 of the insecticide container and distributer.

The rearward movement of the member 1 of the insecticide container and distributer will result in air being sucked through the rear check valve into the space within the member 2 and as pointed out in the foregoing remarks, practically instantaneous closing of the disk valve 24 of the forward check valve will prevent any appreciable suction within the front check valve that would tend to draw powder into the latter from the member 1 were the slits 27 and the unobstructed portions of the openings 28 sufficiently large to permit free passage of powder therethrough into the casing of the front check valve. Forward movement of the member 2 on the member 1 will result in closing of the rear check valve and the forcing of a limited volume of air at high velocity from the space within the member 2 through the front check valve and thence through the powder within the member 1 so that powder will be discharged at high velocity from the small outlet or discharge opening 6 of the member 1.

Obviously, our invention is susceptible of embodiment in forms other than that which is illustrated in the accompanying drawings, and we therefore consider as our own all such modifications and adaptations thereof as fairly fall within the scope of the appended claims.

We claim:—

1. A check valve comprising a casing having openings in opposite ends thereof, a disk valve movable axially of the casing and adapted to cooperate with one end of the casing to cover the opening in that end, and a stop disk secured within the casing against the opposite end of the latter for preventing said disk valve from moving against said second named end of the casing, said stop disk having an aperture in position to permit a limited volume of fluid to pass from the space within the casing through the stop disk to the opening in the second named end of the casing, the opening in the second end of the casing comprising a narrow slit.

2. A check valve having a casing comprising a body formed with a head at one end and open at its opposite end, said head having an inlet opening formed therein said body having an out-turned flange at its open end, a second head having an outlet opening, and bendable means carried by said second head adapted to be bent over the edge of said flange and into engagement with an adjacent support for connecting the second head with the casing body and with said support.

3. A check valve having a casing comprising a body formed with a head at one end and open at its opposite end, said head having an inlet opening formed therein, a second head having an outlet opening, means carried by said second head for connecting the second head with the casing body and with an associated support, and a disk valve loosely disposed in the casing body and adapted to move axially of the casing body, said disk valve being adapted to cooperate with said first named head to cover the opening in the latter, and an apertured stop disk held in place in said valve casing by said second named head, said stop disk preventing said valve disk from moving against the second named head and being adapted to cooperate with the disk valve to permit only a limited volume of fluid to pass from the casing body through the stop disk to the opening in the second named head.

4. A check valve having a casing comprising a body formed with a head at one end and open at its opposite end, said head having an inlet opening formed therein, a second head having an outlet opening, means carried by said second head for connecting the second head with the casing body and with an associated support, and a disk valve loosely disposed in the casing body and adapted to move axially of the casing body, said disk valve being adapted to cooperate with said first named head to cover the opening in the latter, and an apertured stop disk held in place in said valve casing by said second named head, said stop disk preventing said valve disk from moving against the second named head and being adapted to cooperate with the disk valve to permit only a limited volume of fluid to pass from the casing body through the stop disk to the opening in the second named head, the opening in the second named head comprising a plurality of radially directed slits in said second named head.

5. A check valve comprising a tubular body having an integral head at one end, said head having a central port, said head also having an outwardly turned flange at its second end, a stop disk of greater diameter than said casing body, a second head having an annular attaching portion at its edge adapted to fit on the flange of said casing body and to clamp the marginal edge portion of said stop disk against said flange of the casing body, said second named head having a convexo-concave central portion provided with an outlet opening, said stop disk having a plurality of apertures arranged in a circle concentric with the stop disk, the inner edges of said apertures in the stop disk extending toward the center of the stop disk beyond the line of juncture of the convexo-concave portion of the second named head with the remainder of the second named head, and a disk valve loosely disposed within the casing body and movably axially between said stop disk and the first named head, the area of said disk valve being less than that of a circle tangent to the outer edges of the apertures in said stop disk.

6. A check valve comprising a tubular body having an integral head at one end, said head having a central port, said head also having an outwardly turned flange at its second end, a stop disk of greater diameter than said casing body, a second head having an annular attaching portion at its edge adapted to fit on the flange of said casing body and to clamp the marginal edge portion of said stop disk against said flange of the casing body, said second named head having a convexo-concave central portion provided with an outlet opening, said stop disk having a plurality of apertures arranged in a circle concentric with the stop disk, the inner edges of said apertures in the stop disk extending toward the center of the stop disk beyond the line of juncture of the convexo-concaved portion of the second named head with the remainder of the second named head, and a disk valve loosely disposed within the casing body and movable axially between said stop disk and the first named head, the area of said disk valve being less than that of a circle tangent to the outer edges of the apertures in said stop disk, said disk valve being polygonal in cross sectional configuration and said first named head having an inwardly turned annular corrugation producing a valve seat in the first named head, the area of the space within said corrugation being less than the cross sectional area of said check valve.

7. A check valve comprising a tubular body having an integral head at one end, said head having a central port, said head also having an outwardly turned flange at its second end, a stop disk of greater diameter than said casing body, a second head having an annular attaching portion at its edge adapted to fit on the flange of said casing body and to clamp the marginal edge portion of said stop disk against said flange of the casing body, said second named head having a convexo-concave central portion provided with an outlet opening, said stop disk having a plurality of apertures arranged in a circle concentric with the stop disk, the inner edges of said apertures in the stop disk extending toward the center of the stop disk beyond the line of juncture of the convexo-concave portion of the second named head with the remainder of the second named head, a disk valve loosely disposed within the casing body and movable axially between said stop disk, and the first named head, the area of said disk valve being less than that of a circle tangent to the outer edges of the apertures in said stop disk, a plate having an opening through which said casing body extends, the portion of said plate surrounding said opening being formed to produce an annular seat at its inner side for engaging with the edge portion of said annular attaching portion of the second second named head when the edge portion of said annular attaching portion has been turned inward over the edge of the flange on said casing body.

8. A check valve comprising a tubular body having an integral head at one end, said head having a central port, said head also having an outwardly turned flange at its second end, a stop disk of greater diameter than said casing body, a second head having an annular attaching portion at its edge adapted to fit on the flange of said casing body and to clamp the marginal portion of said stop disk against said flange of the casing body, said second named head having a convexo-concave central portion provided with an outlet opening, said stop disk having a plurality of apertures arranged in a circle concentric with the stop disk, the inner edges of said apertures in the stop disk extending toward the center of the stop disk beyond the line of juncture of the convexo-concave portion of the second named head with the remainder of the second named head, a disk valve loosely disposed within the casing body and movable axially between said stop disk, and the first named head, the area of said disk valve being less than that of a circle tangent to the outer edges of the apertures in said stop disk, a plate having an opening through which said casing body extends, the portion of said plate surrounding said opening being formed to produce an annular seat at its inner side for engaging with the edge portion of said annular attaching portion of the second named head when the edge portion of said annular attaching portion has been turned inward over the edge of the flange on said casing body, said plate also being formed to produce a tapering annular shoulder outwardly of said annular seat and concentric therewith.

JOSIAH FLOURNOY.
ALBERT P. TREADWELL.